(12) United States Patent
Thomas (10) Patent No.: US 12,500,408 B2
(45) Date of Patent: *Dec. 16, 2025

(54) RECREATIONAL VEHICLE POWER MONITORING AND REPORTING DEVICE AND METHOD

(71) Applicant: Hughes Autoformers LLC, Anaheim, CA (US)

(72) Inventor: Patrick Allan Thomas, Yorba Linda, CA (US)

(73) Assignee: Hughes Autoformers LLC, Anaheim, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/768,577

(22) Filed: Jul. 10, 2024

(65) Prior Publication Data

US 2024/0364105 A1 Oct. 31, 2024

Related U.S. Application Data (63) Continuation of application No. 17/326,190, filed on May 20, 2021, now Pat. No. 12,057,696, which is a continuation-in-part of application No. 16/299,144, filed on Mar. 12, 2019, now Pat. No. 11,128,934.

(60) Provisional application No. 62/641,150, filed on Mar. 9, 2018.

(51) Int. Cl.
*B60R 16/03* (2006.01)
*B60P 3/36* (2006.01)
*H02H 1/00* (2006.01)
*H02H 3/04* (2006.01)
*H02H 3/20* (2006.01)
*H02H 9/04* (2006.01)
*H04B 5/00* (2024.01)

(52) U.S. Cl.
CPC .............. *H02H 9/04* (2013.01); *B60P 3/36* (2013.01); *B60R 16/03* (2013.01); *H02H 1/0007* (2013.01)

(58) Field of Classification Search
None
See application file for complete search history.

(56) References Cited

U.S. PATENT DOCUMENTS

| 5,555,483 | A | | 9/1996 | Pressman et al. |
| 6,087,818 | A | * | 7/2000 | Hughes ............... H01F 27/04 323/356 |
| 6,965,818 | B2 | | 11/2005 | Koenig et al. |
| 10,414,357 | B1 | * | 9/2019 | Sorensen ............... H04W 4/35 |

(Continued)

OTHER PUBLICATIONS

Commonly assigned co-pending U.S. Appl. No. 16/299,144, filed Mar. 12, 2019, including Information Disclosure Statement as filed Jul. 25, 2019 and all references.

(Continued)

*Primary Examiner* — Curtis A Kuntz
*Assistant Examiner* — Jerold B Murphy
(74) *Attorney, Agent, or Firm* — Price Heneveld LLP (57) ABSTRACT

A power monitoring device is configured to monitor the aspects of power being supplied to an RV at an RV park. The power monitoring device communicates wirelessly to a remote device of a user to provide information about the power supplied by the park. The user can set limits of various power aspects. If aspects of the power supplied are out of compliance with the limits a notification of such may be delivered to the user's remote device.

25 Claims, 10 Drawing Sheets

(56) References Cited

U.S. PATENT DOCUMENTS

| | | | |
|---|---|---|---|
| 11,128,934 B2* | 9/2021 | Thomas | H04B 5/70 |
| 12,057,696 B2* | 8/2024 | Thomas | B60R 16/03 |
| 2010/0023286 A1 | 1/2010 | Rodseth et al. | |
| 2011/0202418 A1 | 8/2011 | Kempton et al. | |
| 2013/0197748 A1 | 8/2013 | Whitaker | |

OTHER PUBLICATIONS

Commonly assigned co-pending U.S. Appl. No. 17/326,190, filed May 20, 2021, including all references.

* cited by examiner

RECREATIONAL VEHICLE POWER MONITORING AND REPORTING DEVICE AND METHOD

CROSS-REFERENCE TO RELATED APPLICATIONS

The application is a continuation of U.S. patent application Ser. No. 17/326,190, filed May 20, 2021, entitled RECREATIONAL VEHICLE POWER MONITORING AND REPORTING DEVICE AND METHOD, which is a continuation-in-part of U.S. patent application Ser. No. 16/299,144, filed Mar. 12, 2019, entitled RECREATIONAL VEHICLE POWER MONITOR AND REPORTING DEVICE AND METHOD, now U.S. Pat. No. 11,128,934, which claims benefit of U.S. Provisional Application No. 62/641,150, filed Mar. 9, 2018, the entirety of which are hereby incorporated by reference.

BACKGROUND

The present disclosure relates to the field of power monitoring and/or power conditioning devices for recreational vehicles.

Most recreational vehicles (RVs) have the capability to hook up to an external power supply ("shore power") in order to supply electrical power to the RV. RV parks typically provide such power via electrical hookups disposed at power pedestals adjacent the RV's parking space. However, RV parks are notorious for having low-quality power supplies, often providing power at exceedingly high or low voltage levels, and tending to have power spikes and surges. Such power supply problems can cause damage to electrical devices ranging from causing premature wear to the devices to overloading and causing catastrophic failure of device controls.

As such, wise RV owners will hook up their RVs to such power pedestals using power conditioning apparatus interposed between the RV's electrical system and the RV park's power pedestal. Such power conditioning apparatus can include, for example, surge protectors and/or autoformers.

However, even though RV owners can employ apparatus to protect their RVs, it can be inconvenient or impossible to check the status of power being delivered to the RV, or to know what is or has happened to such power. This is especially true when the RV user is remote from the RV.

SUMMARY

Accordingly, there is a need in the art for a device and method for monitoring and conditioning shore power as delivered to a user's RV, protecting the RV from problems with shore power, and communicating information about power delivery to the RV user in a convenient and usable manner.

In accordance with one embodiment, the present specification provides a method for monitoring and reporting power supplied to a recreational vehicle, comprising attaching a power monitor device to a park power supply, and attaching an electrical system of the recreational vehicle to an outlet of the power monitor device, the power monitoring device sensing raw power aspects; comparing the sensed raw power aspects with threshold maximum and/or minimum values; and if the sensed raw power aspect is greater than the threshold maximum value or less than the threshold minimum value, generating a notification and delivering the notification to a remote computing device via a wireless communications medium.

DESCRIPTION

Figure 1:
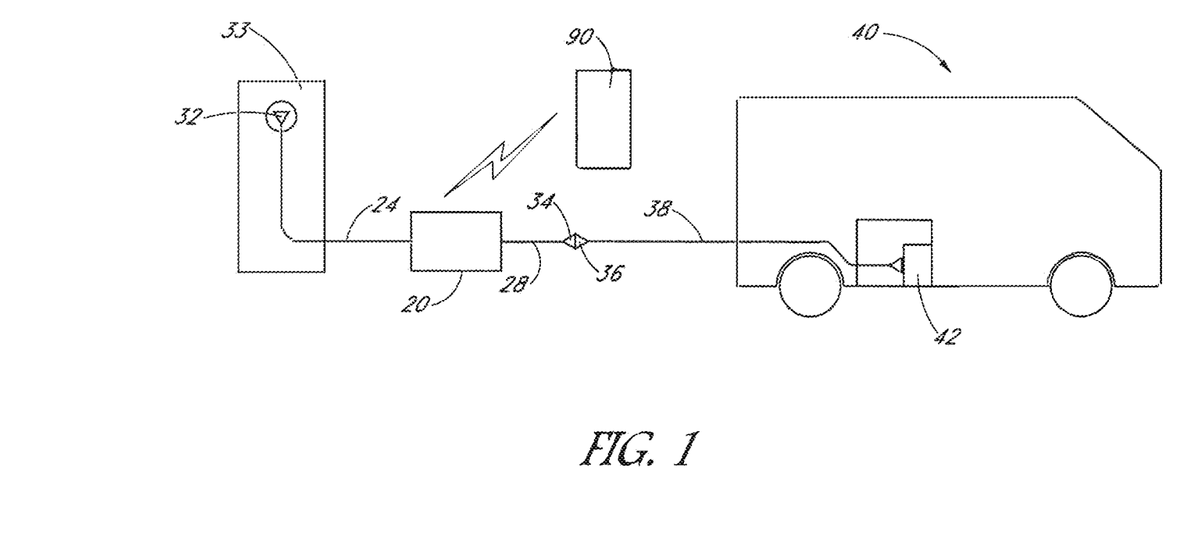
FIG. 1 is a schematic view of a power conditioner setup in accordance with one embodiment.
Figure 2:
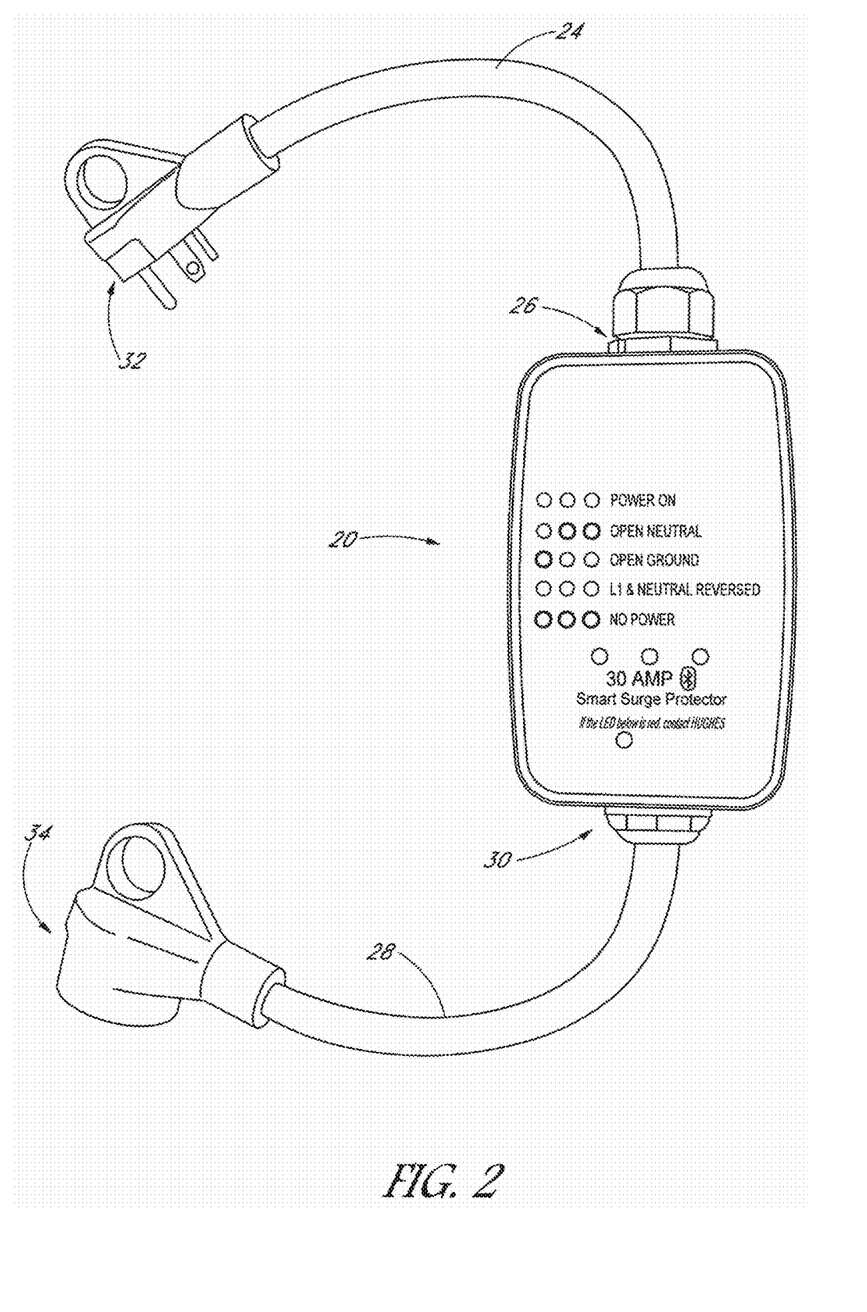
FIG. 2 shows one embodiment of a power conditioner device.

With initial reference to FIGS. 1 and 2, an embodiment of a power monitoring device comprises a housing connected to an input wire at an input end and an output wire at an output end. The input wire has an input plug configured to be plugged into an RV park power supply ("shore power"); the output wire has an output plug configured to accept a plug from a power wire of an RV. The RV power wire connects to a transfer switch box of the RV, which connects to the RV's electrical supply system. As such, the power monitoring device is interposed, electrically and physically, between an RV and the shore power.

Figure 3:
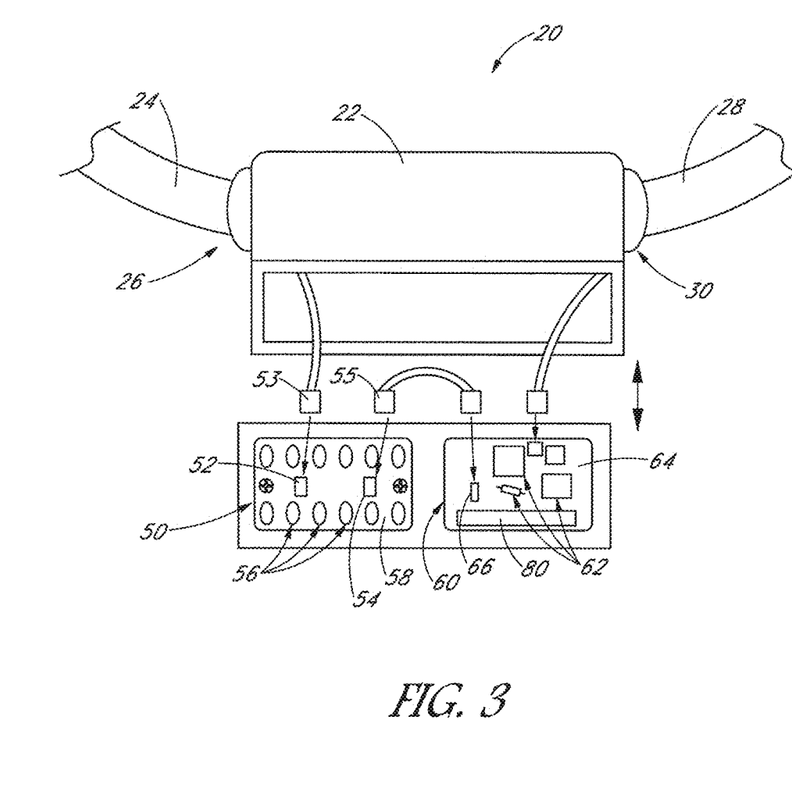
FIG. 3 shows a partially disassembled view of the power conditioner of FIG. 2.

With additional reference to FIG. 3, the housing encloses a power conditioner module and a power monitoring module, In the illustrated embodiment, the power conditioner module comprises a surge protector configured to perform the power conditioning function of protecting downstream electrical devices from problems with the RV park source power, such as voltage spikes. A first connector connects to input power from the RV park source power, which typically is disposed on a power panel, and such input power flows through the surge protector of the power conditioner to a second, output connector. It is to be understood that other types of power conditioners can alternatively or additionally be included within the housing. As shown, the illustrated surge protector comprises several electronic components mounted on a single printed circuit board.

Continuing with additional reference to FIG. 3, the power monitoring module comprises several electronic components, such as sensors, processor(s), integrated circuits, and/or other electronic componentry mounted on a printed circuit board which, in the illustrated embodiment, is a different circuit board than that upon which the surge protector is mounted. An input connector of the power monitoring module can be releasably attached to the second connector of the power conditioner so that, after being conditioned, power flows to the power monitoring module.

The electronic components of the power monitoring module are configured to sense a plurality of energy parameters of the input power flowing from the RV park source power through the power monitoring device. Such sensing parameters can include, for example, basic parameters such as whether electricity is flowing through one or more output lines, the status of ground structures, and electricity flow parameters such as voltage, current (amps), and power delivery (watts). The electronic components include processing capability that is able to perform analysis/calculations on the sensor readings and also a memory component so that measurements and/or calculations can be saved to the memory. As such, the power monitoring module can sense, calculate, track and save parameters such as amps, watts, volts, energy used in a current session, total energy used over a period of time, and other parameters as desired.

Figure 4:
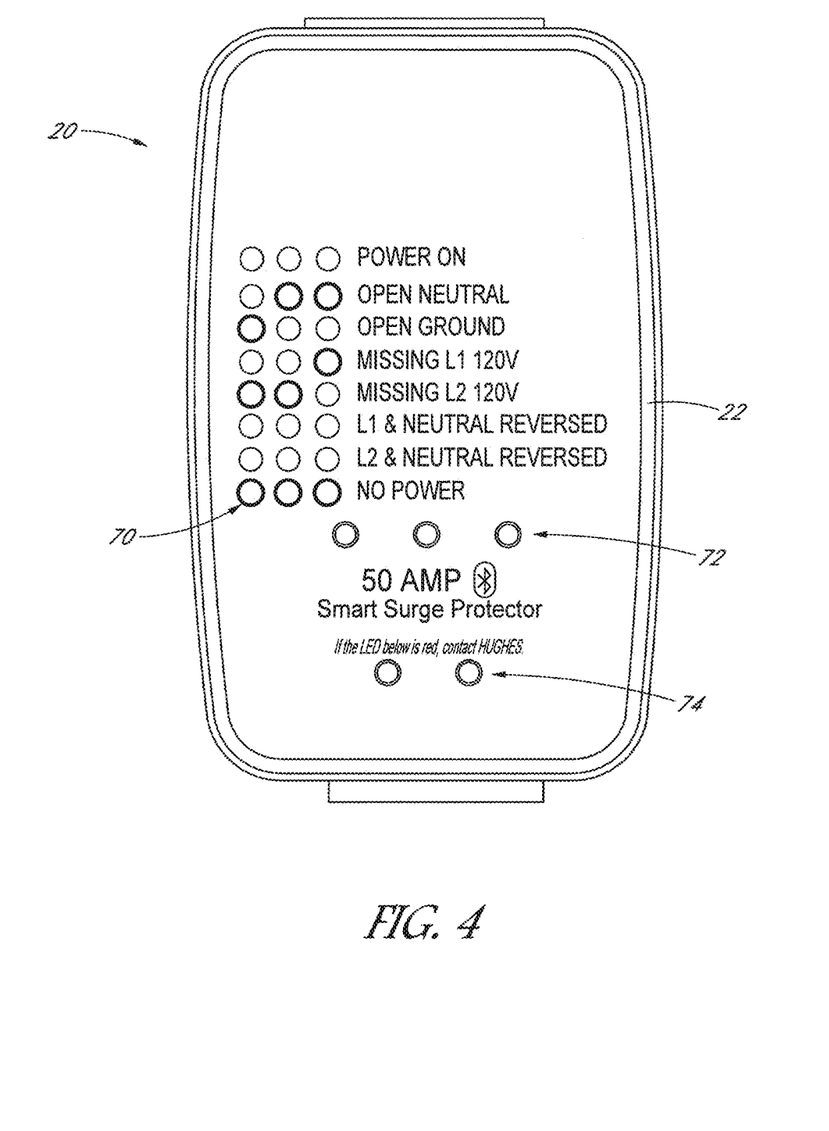
FIG. 4 shows another embodiment of a power conditioner device.

Continuing with reference to FIGS. 1-3, and with additional reference to FIG. 4, preferably a display is provided on the housing. In the illustrated embodiments, the display is configured to provide basic information about electricity delivery, such as whether power is "on", and whether electrical connections such as neutral and ground structures are appropriately connected. Embodiments of power monitoring devices can be configured for different power levels. For example, it is typical for RV parks to provide a choice between 30 Amp and 50 Amp power supply service. An embodiment employing only 30 Amp service (see FIG. 2) is less complex than that configured for 50 Amp service (see FIG. 4), as the 50 Amp embodiment will track multiple output lines.

In the illustrated embodiments, the power monitoring module includes an array of three LED lamps-preferably RGB multicolor lamps, which are aligned to be visible through the housing at the display. The power monitoring module directs the LED lamps to be lit in a pattern that provides information about the condition of power delivery. Meanings of the various patterns are provided on the display adjacent the lamps.

In the illustrated embodiment, the power conditioner module also includes one (for 30 Amp) or more (2 for a 50 Amp embodiment) LEDs that are also configured so as to be visible through the housing and on the display, adjacent a textual message concerning their meaning. In the illustrated embodiments, the power conditioner is a surge protector. As is known, surge protectors can become less effective when subjected to electrical surges while protecting downstream electrical equipment. Thus, surge protectors eventually can wear out. In the illustrated embodiments, the power conditioner module includes electronic circuitry that senses parameters and conditions of the surge protector electronics and can determine when the surge protector should be replaced. Upon such a determination, one or more of the surge protector LEDs will be lit, signaling a user that it is time to replace the surge protector.

With particular reference to FIG. 3, preferably the power conditioner module can be replaced independent of the power monitoring module, so as to enable replacement of a worn-out surge protector without disturbing the power monitoring module. Specifically, since the power conditioner module electronics are mounted on a different circuit board than that of the power monitoring module, a user can access the housing, detach the electrical connectors that electrically connect the power conditioning module to the power monitoring module and to the power input, remove the entire module, and replace it with a new module. As such, if a surge protector is worn out, not only will the user be informed that it is time to replace it, but the user need not discard the entire power monitor (which would include the still-functional power monitoring module), but can instead replace only the portion of the power monitor that needs replacing.

Figure 5:
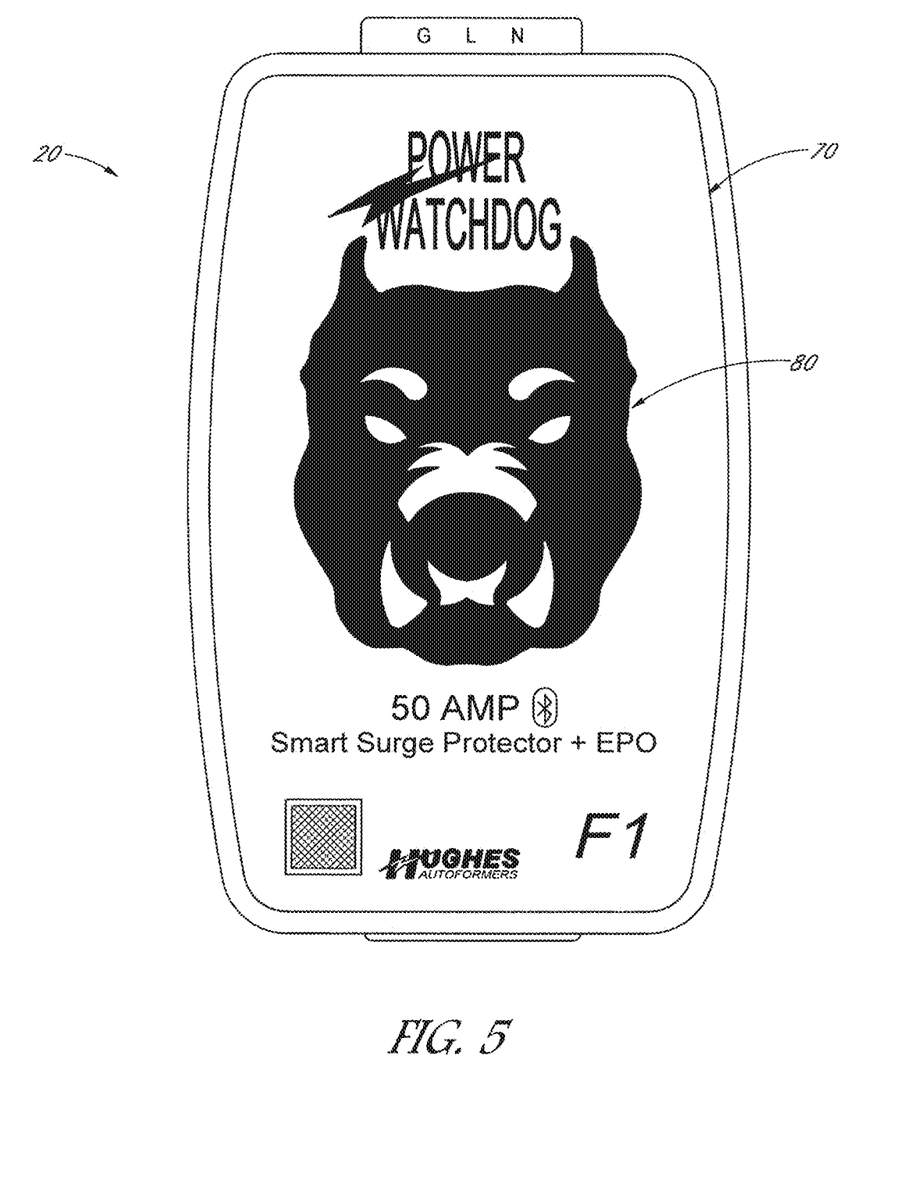
FIG. 5 shows yet another embodiment of a power conditioner device.
Figure 6:
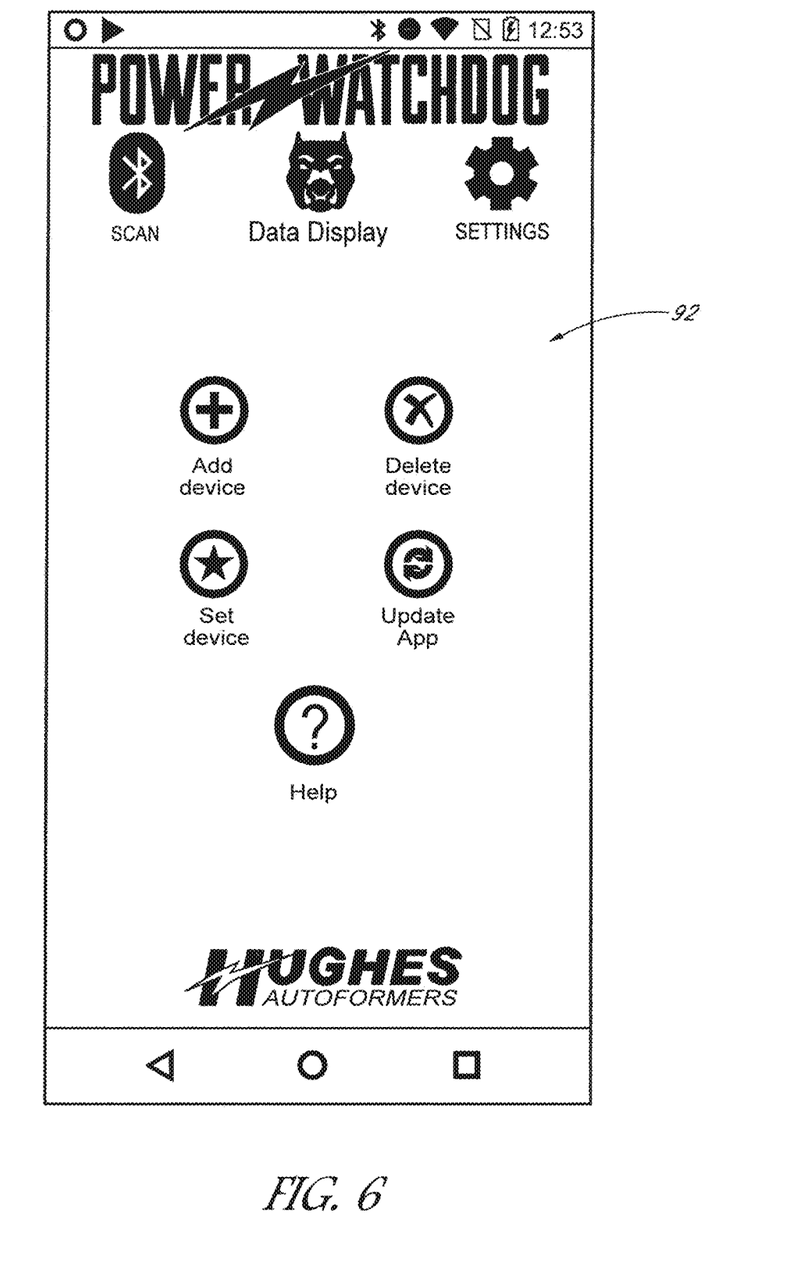
FIG. 6 shows a screen of an app for use with a remote device in communication with the power conditioner device.
Figure 7:
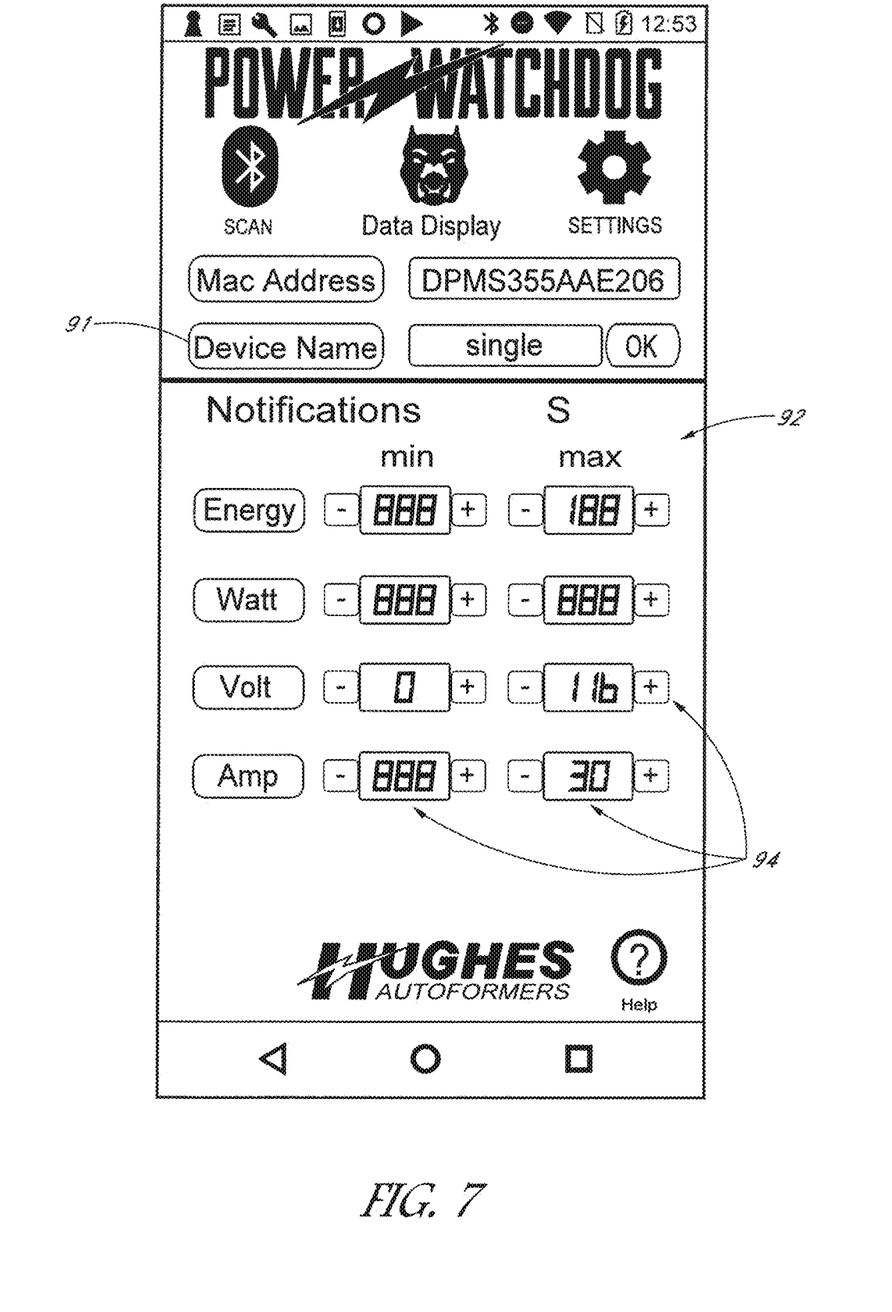
FIG. 7 shows another screen of an app for use with a remote device in communication with the power conditioner device.

With reference next to FIG. 5, another embodiment of a power monitoring device has a different configuration for the display. For example, an LCD display controlled by the power monitoring module displays codes indicating the current power conditions. An indicator LED (preferably red) is configured to alight if the power monitoring module detects a power supply problem. For example, in the illustrated embodiment, the indicator LED glows red when the park power is missing a neutral.

Additionally, in the illustrated embodiment, a plurality of LEDs are configured to alight the graphic, which preferably is configured as a lens that glows when the associated LEDs are actuated. When power is connected and operating properly, the power monitoring module preferably controls the LEDs to glow white. Thus, a white glow indicates properly-operating park supply power. This is particularly effective at night, as the white glow is configured to light up the park power panel and surrounding area, providing users with a quick and easy way to check power status remotely, and also providing a night light to discourage prowlers or thieves. When the power monitoring module determines that there is a power problem, the module may control the LEDs to glow a different color, such as red. This, again, provides an easily-visible indicator to the user, prompting the user to take a closer look at the power performance.

With reference again to FIG. 3, preferably the power monitoring device includes a wireless communication module. Such a wireless communication module can include electronic structure for processing, transmitting and receiving wireless signals, and may include or interface with an antenna structure (which may comprise one or more antennae) that can be mounted within or as part of the housing and/or within or in conjunction with one or more of the input and output wires. Preferably at least the power monitoring module—and in some embodiments the power conditioning module—communicates with the wireless communication module so that electrical parameters can be wirelessly communicated to a remote device, such as a computing device including a tablet, smartphone, the cloud, etc. In the illustrated embodiment, the wireless communication module is mounted on and supported by the power monitoring module. In additional embodiments the wireless communication module can be mounted within the housing having its own printed circuit board separate from the other modules.

In the illustrated embodiment, the wireless communication module comprises a Bluetooth communications structure. Software such as an "app" is loaded onto the remote computing device that is equipped to receive Bluetooth communications, and thus the power monitoring device is able to communicate electrical performance data to the remote device via the wireless communication module. In the illustrated embodiment, the remote device comprises a smartphone, and the app enables electronic parameters to be displayed on the smartphone screen. In some embodiments, the same display features that are provided on the display of the power monitoring device housing can also be communicated to and displayed by the remote device.

Figure 8:
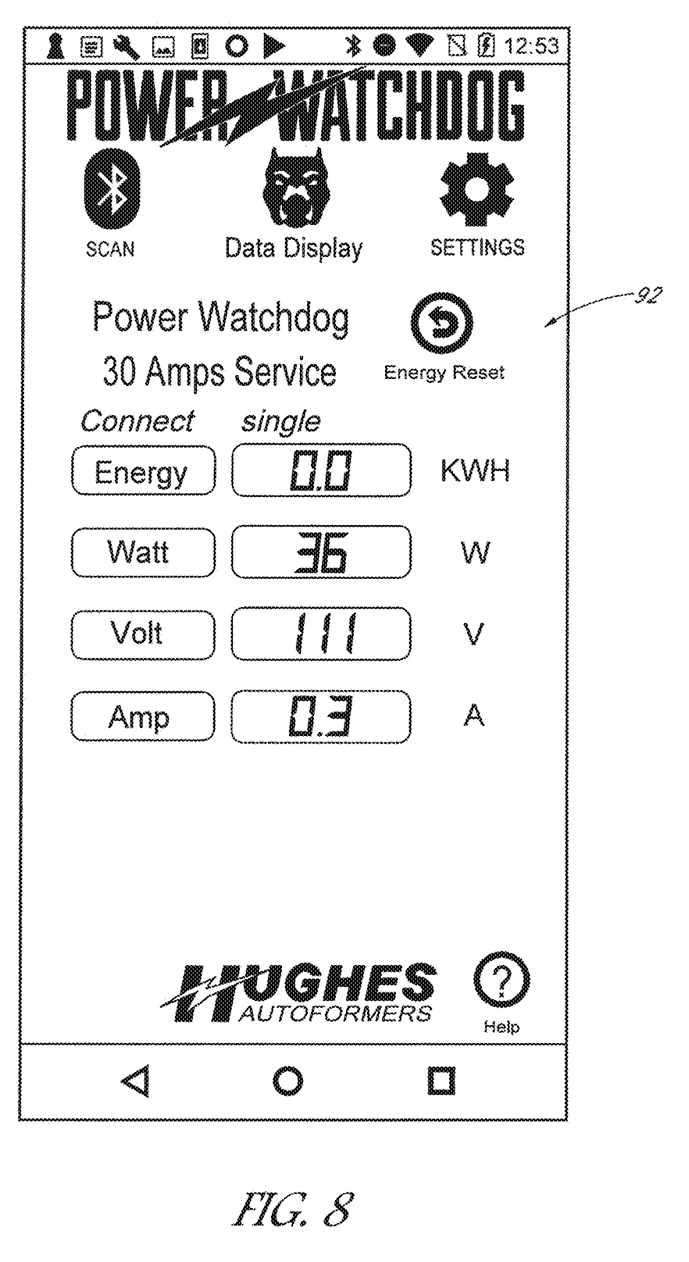
FIG. 8 shows yet another screen of an app for use with a remote device in communication with the power conditioner device.

Preferably the remote device can be conventionally paired with the power monitoring device via Bluetooth. With additional reference to FIGS. 6-9, the app enables selective pairing to one or more power monitoring devices, and enables the user to assign a unique name to each paired device. Once set up, the power monitoring device will transmit data to the remote device, enabling the user to view and monitor power parameters. Such data can be transmitted automatically in real time or periodically, or upon request from the remote device, as desired. In the illustrated embodiments (see FIG. 8-9) power parameters such as the voltage and current in each line, watts supplied, and overall energy supplied are displayed. It is to be understood that more or less power information can be supplied as desired. Also, in some embodiments the app will enable access to historical data, and can even calculate and display comparisons of current, real time power use data with historical power use data.

As noted above, RV park power supplies are marked by inconsistency and low quality. Such low-quality power supplies can have a negative effect on aspects of the RV electrical system. Accordingly, in a preferred embodiment, not only does the power monitoring device enable real time monitoring of power performance data, but it may also provide notifications to the user's remote device when aspects of the RV park power supply fall out of acceptable ranges. As such, the user can be alerted to address power supply problems before damage is done to the RV's electrical system.

With particular reference again to FIG. 7, preferably the user has the ability to set ranges of acceptable parameters for particular power aspects. In the illustrated embodiment, the app provides input boxes for the user to set acceptable minimum and maximum threshold values of power aspects such as total energy used in a period, energy flow in watts, sensed voltage and sensed current. Notably, in the illustrated embodiment, if the user does not create a MIN or MAX setting for a particular power supply aspect, the device and/or app will not make any determination about whether that particular aspect falls out of any range. Not all boxes provided need be used. Similarly, the user can provide data for both the acceptable MIN and MAX, only the MIN or only the MAX, as desired. Additionally, in some embodiments the app will have certain default values that will be used as the threshold MIN and MAX unless and until changed by the user.

If the sensed supply power aspect falls out of the set ranges, a notification will be sent to the user. Such a notification can take various forms, such as an aural or vibrating alarm via the smartphone's inherent notification programing, and may also come in other forms, such as an email or text message. The user will then be apprised of the power supply problem and may take corrective action as appropriate.

Figure 9:
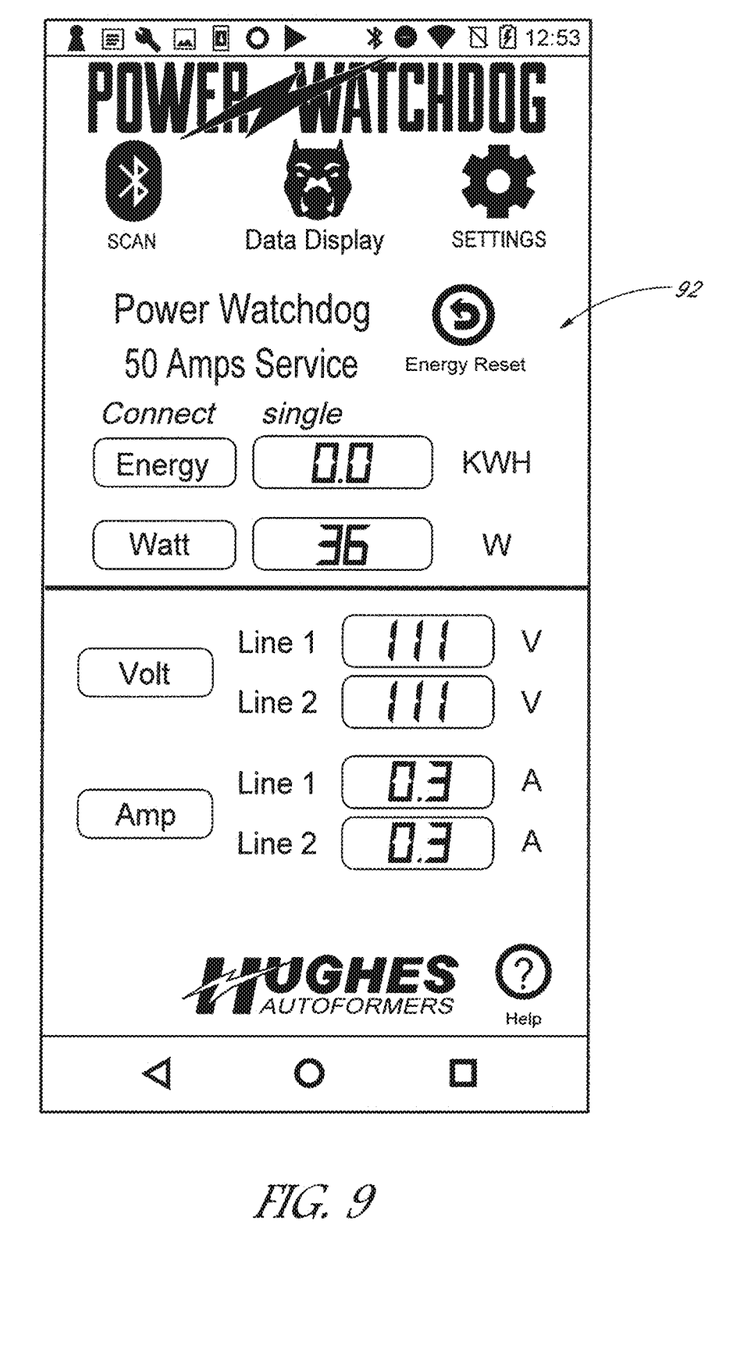
FIG. 9 shows still another screen of an app for use with a remote device in communication with the power conditioner device.

The user may use the remote device to monitor power in real time. For example, 50 Amp arrangements typically employ two power delivery lines into the RV. As depicted in FIG. 9, the electric power characteristics of both lines are monitored. However, appliances that may be used in an RV may draw vastly different loads, and it is preferred to keep the power delivery lines generally equivalent. Thus, a user may use the remote device to arrange the electrical load of appliances or other devices in the RV in a manner that maintains load balance between the power delivery lines.

It is to be understood that additional aspects and power performance issues can be monitored. For example, in some embodiments, a power conditioner device may be configured to automatically cut off power supply to the RV if it is determined that the RV park supply power is of such low quality that damage to the RV's electrical system is imminent. In such an embodiment, a notification may be sent upon cut off of the power supply in order to inform the owner—who may be remote from the RV—that power has been cut off. The notification will include data concerning the power status, showing the reasons why the power was cut off. It is also to be understood that the app can be configured to allow the user to select and set the criteria for cutting off the power supply. For example, the user can enter a MIN voltage setting of 102V and a MAX of 132V, and the power monitoring device will then shut off power if the detected voltage falls below the MIN or above the MAX, and will then notify the user that power was shut off, and why. In still further embodiments, notifications can be generated for maintenance issues. For example, if the power monitoring device determines that the surge protector module is nearly worn out, a notification can be generated to alert the user of the need to replace the surge protector module.

In additional embodiments, the wireless communications module can be configured to extend range from typical Bluetooth communications ranges. For example, additional structure, such as a Bluetooth router (see the Cassia Hub Bluetooth Router available from Cassia Networks) can be employed to extend wireless range. In additional embodiments, the wireless communications module can include WiFi connection capability enabling the power monitor device to connect to RV Park WiFi, a WiFi hub of the RV, or the like.

Figure 10:
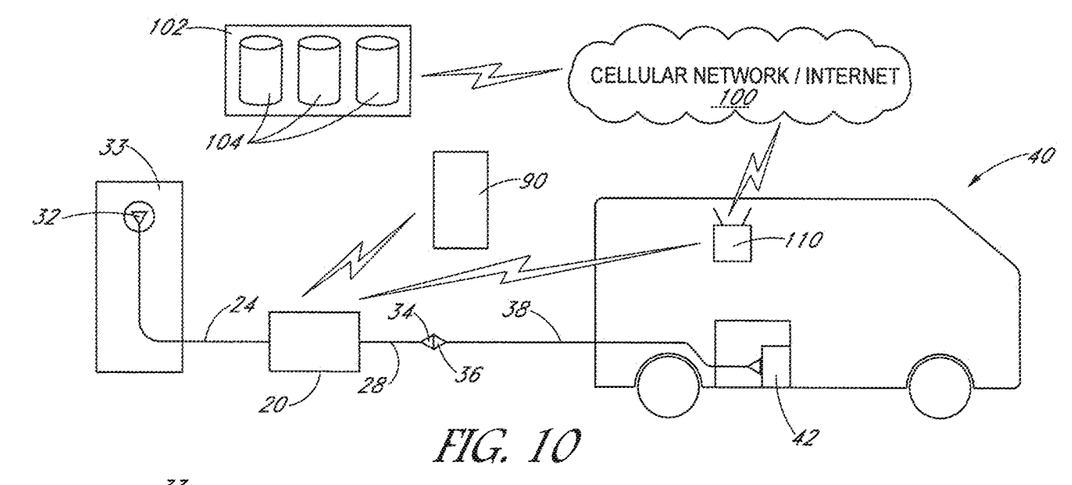
FIG. 10 is a schematic view of another embodiment of a setup employing a power conditioner device.

With additional reference to FIG. 10, in still other embodiments the wireless communications module can include communications structure enabling it to connect to a cellular network or, in still further embodiments, a satellite-based communications network and/or the internet. In some embodiments, communications media such as a cellular data card or embedded cellular gateway can be provided with the housing and configured to enable the power monitor device to connect to a cellular network which, in some embodiments, may connect the power monitoring device with the internet. Further equipment, such as cellular signal boosters, can also be provided within the housing in some embodiments, or as separate structures in other embodiments that can be plugged in or otherwise interfaced with the housing. As such, in some embodiments the power monitoring device may communicate with the remote device via a cellular network and/or the internet, and such communications between the power monitoring device and the remote device may be independent of Bluetooth- or other near-field communications-range.

In such embodiments, the power monitor device may or may not be used in connection with an app installed on the user's smartphone. For example, rather than monitoring power using a screen of an app, notifications when power supply aspects fall outside acceptable ranges can be provided via text messages over the cellular network, or via email notifications from communications through the internet. The user may, in some embodiments, use his remote device to access a web-based service that displays detailed monitoring data for his linked power monitor device. The web-based service may maintain a computer system having one or more databases that can store data and analysis generated by the power monitoring device, and can perform calculations of its own.

As noted above, power supply data can be stored in memory of the device. Data storage and processing can also be performed on the remote computing device. In embodiments in which the device can communicate with the internet, power supply data can be uploaded to the cloud or a host network, where such data can be stored remotely from both the power monitoring device and the linked remote device.

It is also to be understood that sensed power data can be combined or linked with other data. For example, in some embodiments, the power monitoring device can include GPS location capability, and location data can be linked to the sensed power data. In other embodiments, the GPS capability of the user's smartphone is referenced and recorded when the power monitoring device is plugged into the RV park power supply. Power data obtained and stored during the time the device is plugged into that particular power supply is linked to the location data. Such data can be stored on the smartphone, on one or more databases of a remote computer network, or on the power monitoring module. The GPS location can be correlated to the location of the particular RV park. As such, a record or memory is kept of the power supply quality of parks that the user has visited. Such data can also be tied to the detected date(s) of use. In some embodiments, such data can be combined with data obtained from multiple users that subscribe to the same web-based service to create a cloud-based database cataloging users' actual experience with the power supply of particular RV parks.

Figure 11:
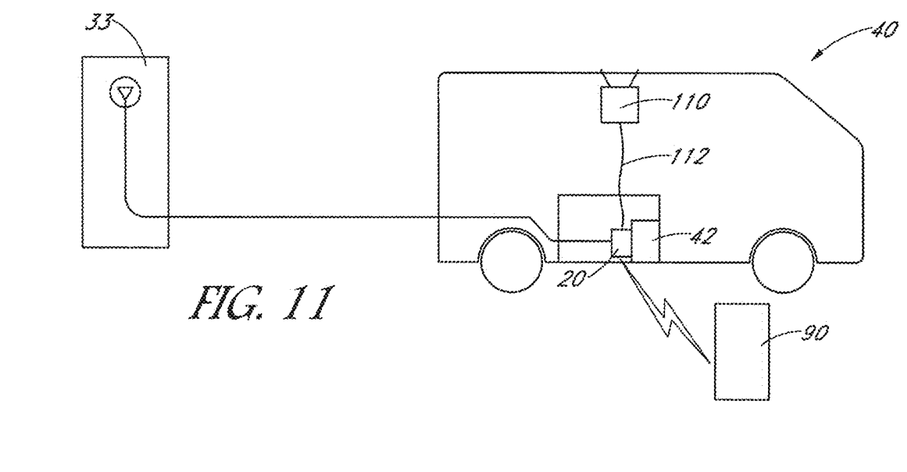
FIG. 11 is a schematic view of yet another embodiment of a setup employing a power conditioner device.

With additional reference to FIG. 11, in some embodiments the power monitoring device can be hard-wired to the switch box of the RV. The power monitoring device can still, however, employ wireless communication with the remote device. In another embodiment, the RV may have its own dedicated wireless communication system, such as a Verizon® JetPack®. The power monitoring device can be configured to communicate wirelessly with the RV's dedicated system or, in additional embodiments, can communicate with the dedicated system via a wire. In some embodiments, the power monitoring system will communicate with the remote device only through the dedicated system. With reference again to FIG. 10, it is contemplated that a line-mounted power monitoring device can also communicate with an RV's dedicated wireless communication system.

The embodiments discussed above have disclosed structures with substantial specificity. This has provided a good context for disclosing and discussing inventive subject matter. However, it is to be understood that other embodiments may employ different specific structural shapes and interactions. For example, in additional embodiments, power conditioners such as autoformers can include power monitoring and wireless communication aspects as discussed herein, and can also include modular, replaceable surge protectors and other power conditioning structures as appropriate and desired. Still further aspects of electrical data may be reported in such embodiments. For example, the autoformer may be prompted to send a notification when the autoformer has been tripped by low-quality input power and is providing modified (but acceptable) power to the RV.

For example, during operation, an autoformer switches between a bypass configuration, which bypasses the transformer of the autoformer, and a tripped configuration, in which the park power is directed through the transformer to raise the voltage supplied to the RV. The wireless communication module may thus notify the user when the autoformer switches between configurations, and may provide the autoformer status. Further, the power monitoring module may communicate with a control circuit of the autoformer to learn the measured park input power, and provide such data to the user.

In still other embodiments, the app running on the remote device may also be configured to be paired with at least some equipment of the RV's electrical system, such as through the RV's dedicated wireless communication system. Such equipment may include their own wireless communication structure or communicate through the RV's dedicated wireless communication system. For example, if the park power supply is cut off, the user will receive a notification of such, as discussed above. The user can then navigate to a page of the app that displays equipment of the RV electrical system that is wirelessly connected, such as the on-board generator and/or battery. The user can then gauge the charge level of the battery to determine whether the battery can, for example, provide sufficient power to keep the A/C or refrigerator operating. If not, the user can signal the generator to begin operation to charge the battery and ensure smooth operation of the RV even though the park power supply has failed, and even though the user may be remote from the RV.

Still further, the power monitoring device can be configured to continue to monitor park power even after cutting off supply power due to power supply problems triggering such a cutoff. In some embodiments, if the park power returns to operating within set limits for a predetermined threshold period of time, the power monitoring device can automatically restore power supply. In additional embodiments, the remote device can have a setting allowing or disallowing such action by the power monitoring device, or providing guidance, such as to allow power delivery to be restored, but if the park supply power goes out of compliance within a threshold period of time so that power is cutoff again, the power monitoring device will not again attempt to restore power until specifically instructed to by the user via the app.

Although inventive subject matter has been disclosed in the context of certain preferred or illustrated embodiments and examples, it will be understood by those skilled in the art that the inventive subject matter extends beyond the specifically disclosed embodiments to other alternative embodiments and/or uses of the invention and obvious modifications and equivalents thereof. In addition, while a number of variations of the disclosed embodiments have been shown and described in detail, other modifications, which are within the scope of the inventive subject matter, will be readily apparent to those of skill in the art based upon this disclosure. It is also contemplated that various combinations or subcombinations of the specific features and aspects of the disclosed embodiments may be made and still fall within the scope of the inventive subject matter. Accordingly, it should be understood that various features and aspects of the disclosed embodiments can be combined with or substituted for one another in order to form varying modes of the disclosed inventive subject matter. Thus, it is intended that the scope of the inventive subject matter herein disclosed should not be limited by the particular disclosed embodiments described above.

The invention claimed is:

1. A vehicle power monitoring device, comprising:
a power input connection configured to receive power from an external power source;
a power output connection configured to transmit power to a vehicle;
a power conditioner module including a surge protector;
a power monitoring module including at least one power monitoring sensor configured to determine a condition of the surge protector;
a transformer switchable between a first configuration where the transformer supplies power at a first voltage, and a second configuration where the transformer raises a voltage of the power received from the external power source to supply power at a second voltage; and a wireless communication module configured to generate and transmit information on at least one of the condition of the surge protector and the configuration of the transformer.

2. The vehicle power monitoring device of claim 1, wherein the wireless communication module is configured to generate and transmit information on the configuration of the transformer.

3. The vehicle power monitoring system of claim 1, wherein the information on the configuration of the transformer includes a measure of the power received from the external power source.

4. The vehicle power monitoring device of claim 1, wherein the vehicle includes a recreational vehicle.

5. The vehicle power monitoring device of claim 1, wherein the external power source includes a recreational vehicle power park power source.

6. The vehicle power monitoring device of claim 1, wherein the power conditioner module is removable, replaceable, and independent of the power monitoring module.

7. The vehicle power monitoring device of claim 1, wherein the wireless communication module is configured to provide a notification to a user if the surge protector requires replacement.

8. The vehicle power monitoring device of claim 1, further comprising:

a housing that substantially contains the power conditioner module and the power monitoring module.

9. The vehicle power monitor device of claim 1, wherein the power supplied by the external power source bypasses the transformer when the transformer is in the first configuration.

10. A vehicle, comprising:

the vehicle power monitoring device of claim 1; and a vehicle wireless communication device configured to allow a user to remotely reconfigure an electrical system of the vehicle to receive power from an alternate power source that is separate from the external power source.

11. The vehicle of claim 6, wherein the alternate power source includes a battery.

12. The vehicle of claim 6, wherein the vehicle power monitoring device is configured to monitor the power received from the external power source such that the electrical system can be reconfigured to receive power from the external power source and reduce or eliminate the power received from the alternate power source without input from the user.

13. The vehicle of claim 6, wherein the vehicle comprises a recreational vehicle.

14. A method for monitoring power received by a vehicle from an external power source via a vehicle power monitoring device, comprising:

receiving power from an external power source via a power input connection of the vehicle power monitoring device;

transmitting power from a power output connection of the vehicle power monitoring device to a vehicle;

determining a condition of a surge protector via at least one power monitoring sensor of a power conditioner module of the vehicle power monitoring device;

providing the vehicle power monitoring device with a transformer switchable between a first configuration where the transformer supplies power at a first voltage, and a second configuration where the transformer raises a voltage of the power received from the external power source to supply power at a second voltage; and generating and transmitting information on at least one of the condition of the surge protector and the configuration of the transformer to a remote user via a wireless communication module of the vehicle power monitoring device.

15. The method of claim 14, wherein the wireless communication module generates and transmits information on the configuration of the transformer.

16. The method of claim 14, wherein the information on the configuration of the transformer includes a measure of the power received from the external power source.

17. The method of claim 14, wherein the vehicle includes a recreational vehicle.

18. The method of claim 14, wherein the external power source includes a recreational vehicle power park power source.

19. The method of claim 14, further comprising:

providing a vehicle wireless communication device configured to allow the user to remotely reconfigure an electrical system of the vehicle to receive power from an alternate power source that is separate from the external power source.

20. The method of claim 19, wherein the alternate power source includes a battery.

21. The method of claim 19, wherein the vehicle power monitoring device is configured to monitor the power received from the external power source such that the electrical system can be reconfigured to receive power from the external power source and reduce or eliminate the power received from the alternate power source without input from the user.

22. The method of claim 14, further comprising:

providing the vehicle which includes a vehicle wireless communication device configured to allow the user to remotely reconfigured an electrical system of the vehicle.

23. The method of claim 14, wherein the wireless communication module is configured to provide a notification to a user if the surge protector requires replacement.

24. The method of claim 14, further comprising:

providing a housing that substantially contains the power conditioner module and the power monitoring module.

25. The method of claim 14, wherein the power supplied by the external power source bypasses the transformer when the transformer is in the first configuration.

* * * * *